Dec. 30, 1941.　　　　J. W. BRYCE　　　　2,268,498
STATISTICAL MACHINE
Filed June 30, 1939　　　9 Sheets-Sheet 3
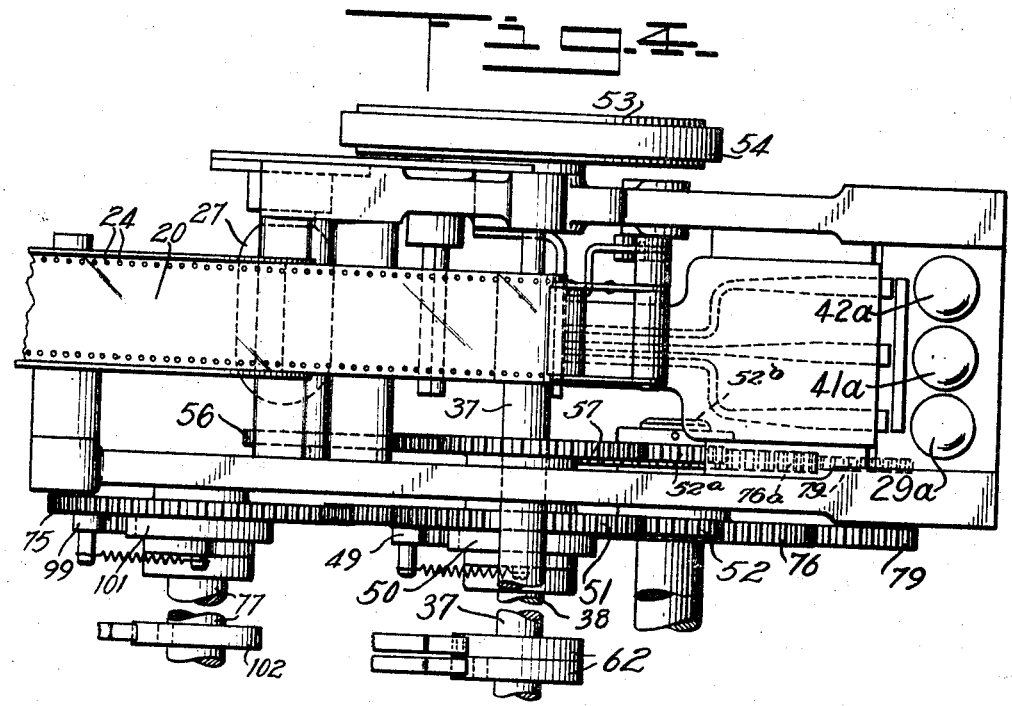
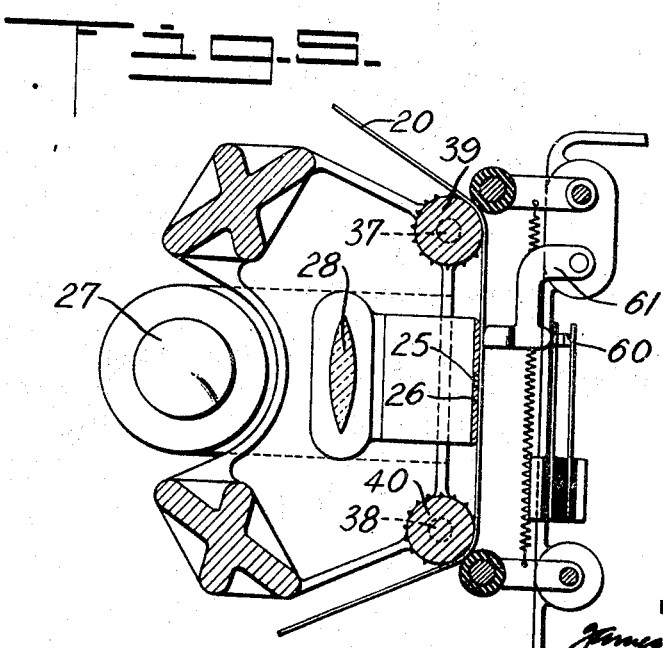
INVENTOR
James W. Bryce
BY
ATTORNEY Dec. 30, 1941.            J. W. BRYCE            2,268,498
STATISTICAL MACHINE
Filed June 30, 1939            9 Sheets-Sheet 4
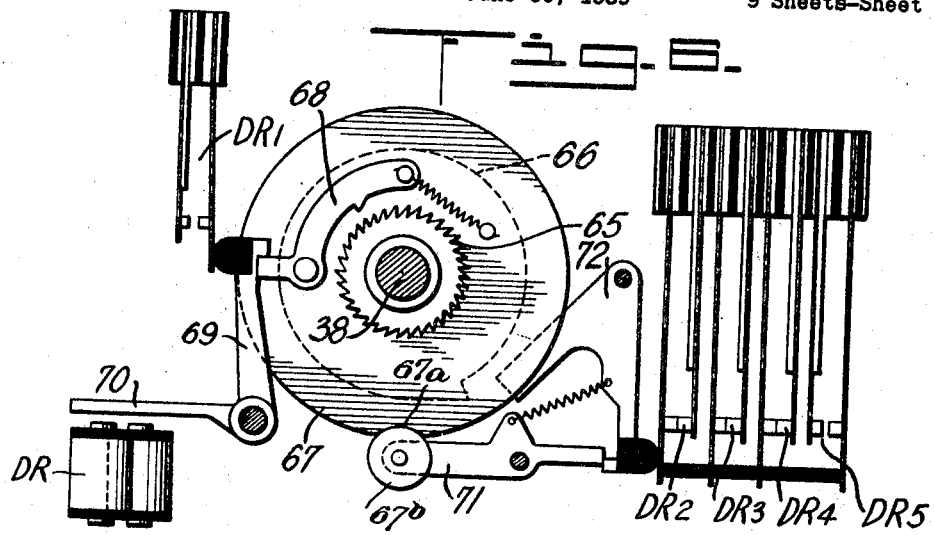
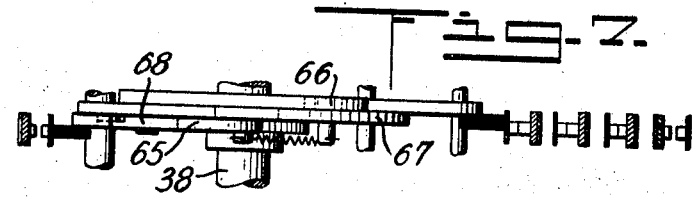
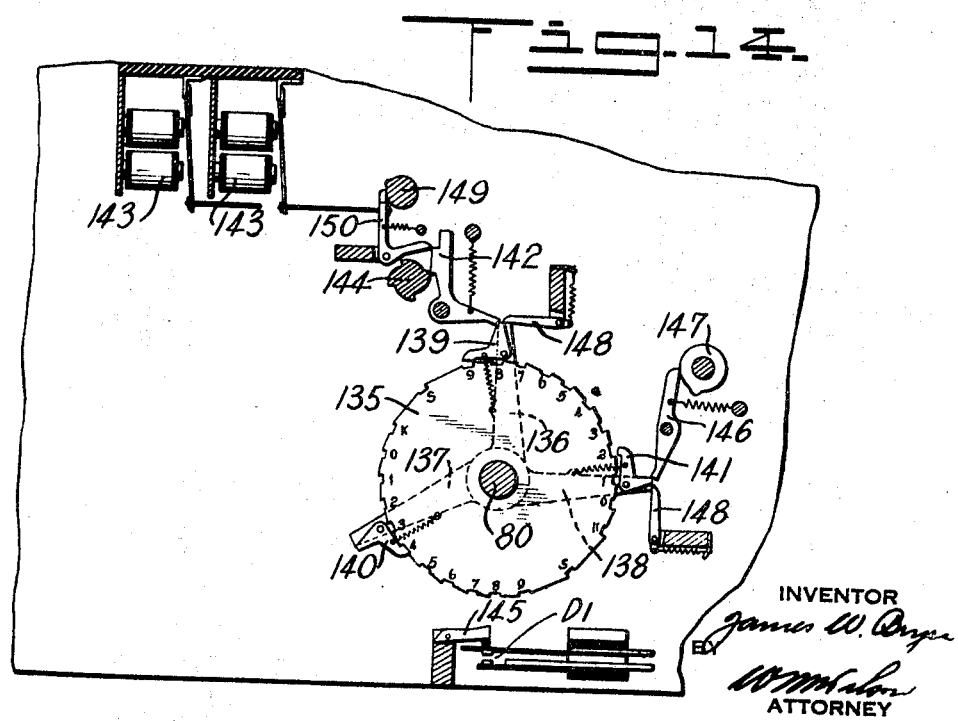
INVENTOR
James W. Bryce
BY
ATTORNEY Dec. 30, 1941.   J. W. BRYCE   2,268,498
STATISTICAL MACHINE
Filed June 30, 1939   9 Sheets-Sheet 5
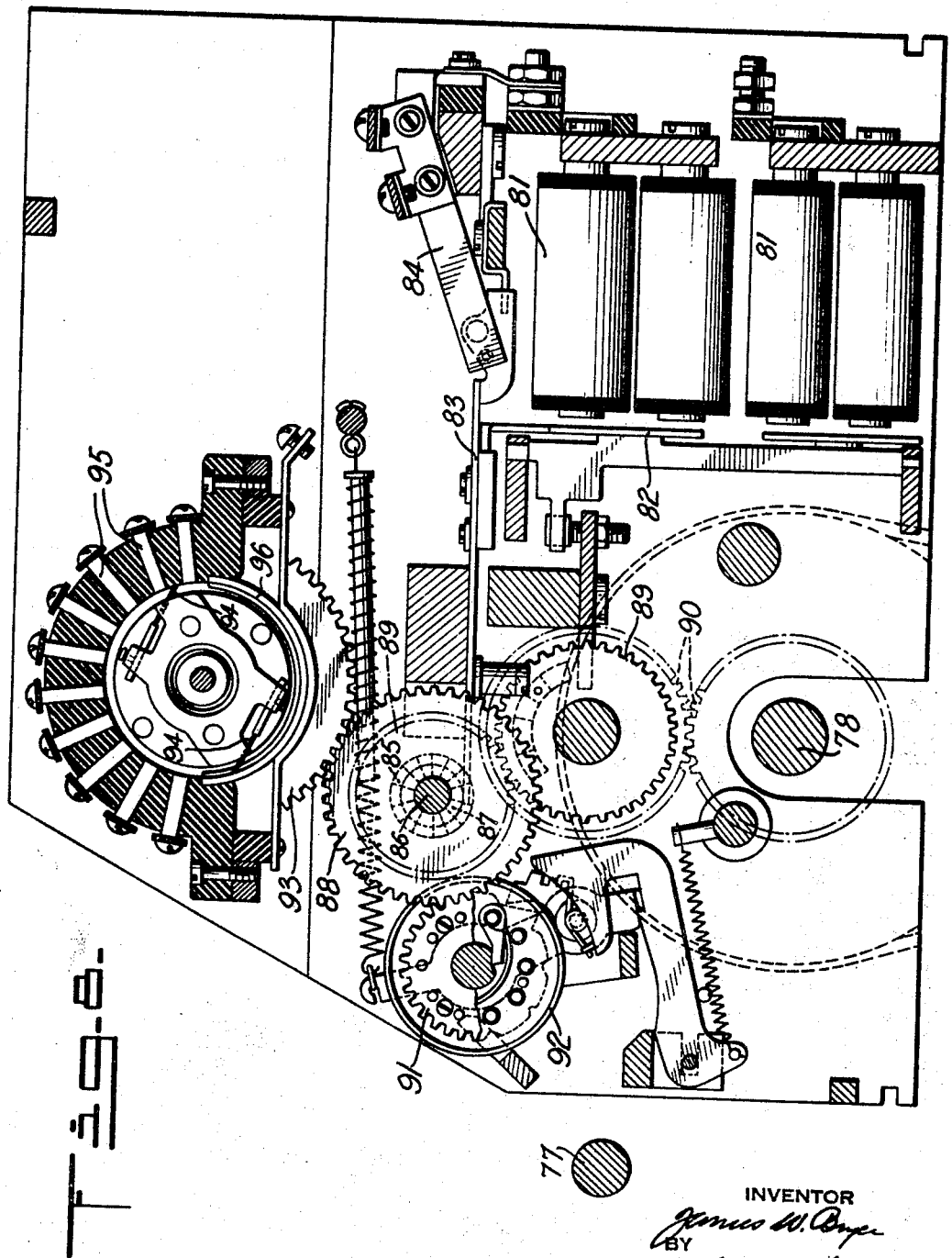
INVENTOR
James W. Bryce
BY
ATTORNEY

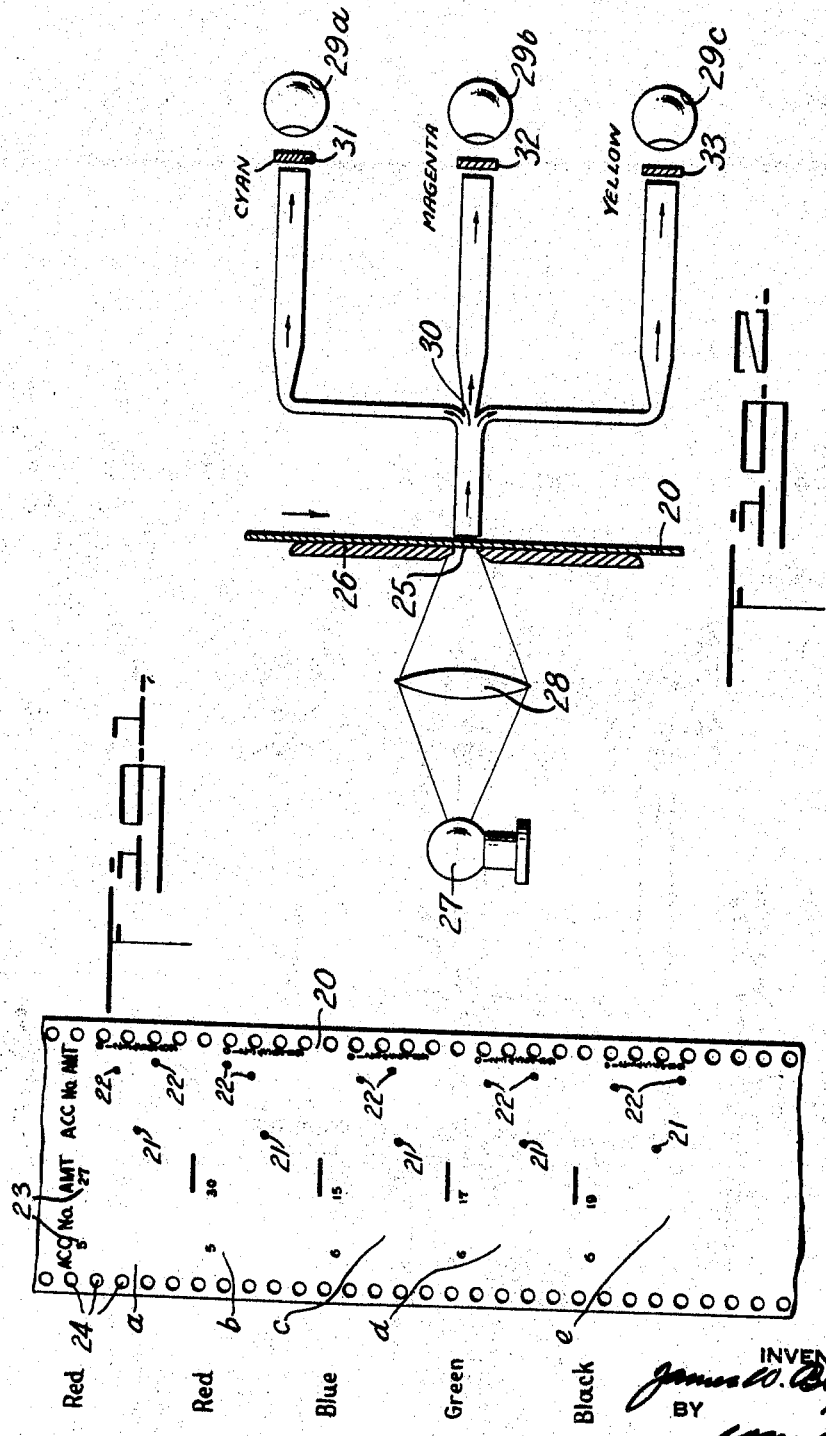

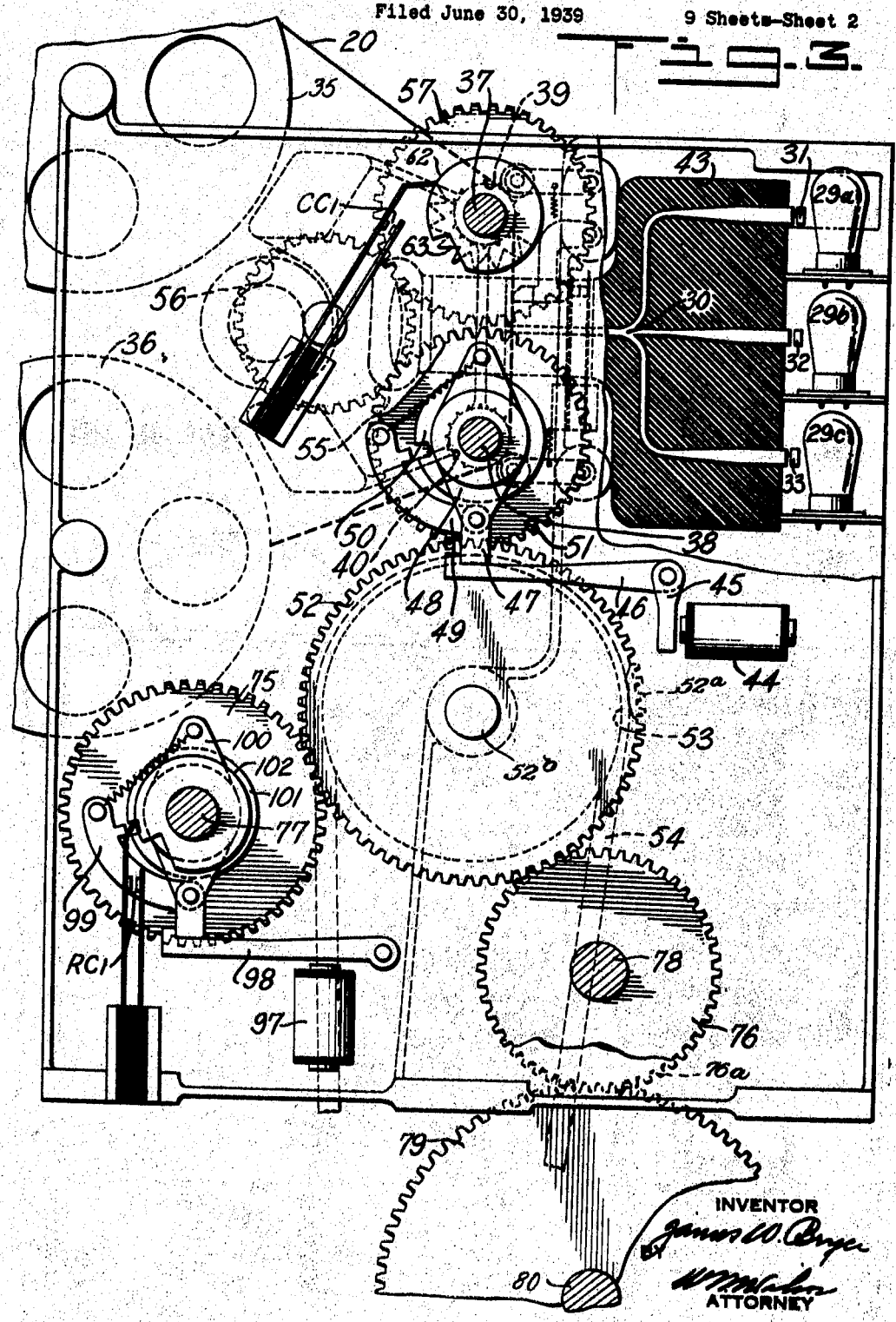

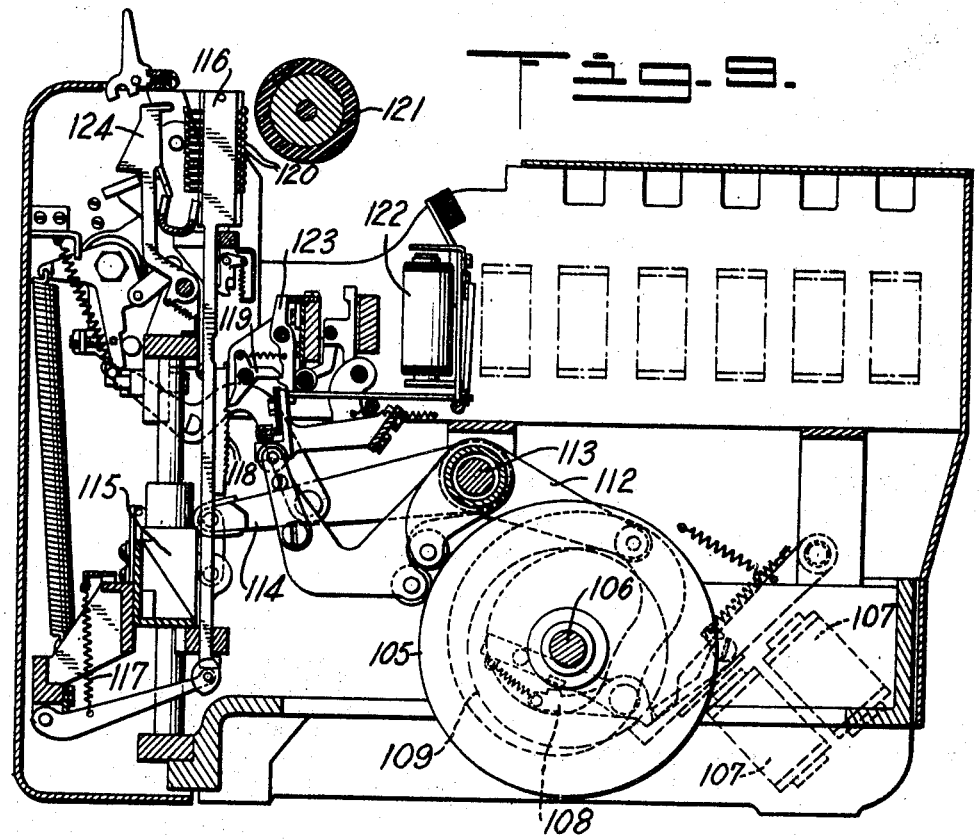
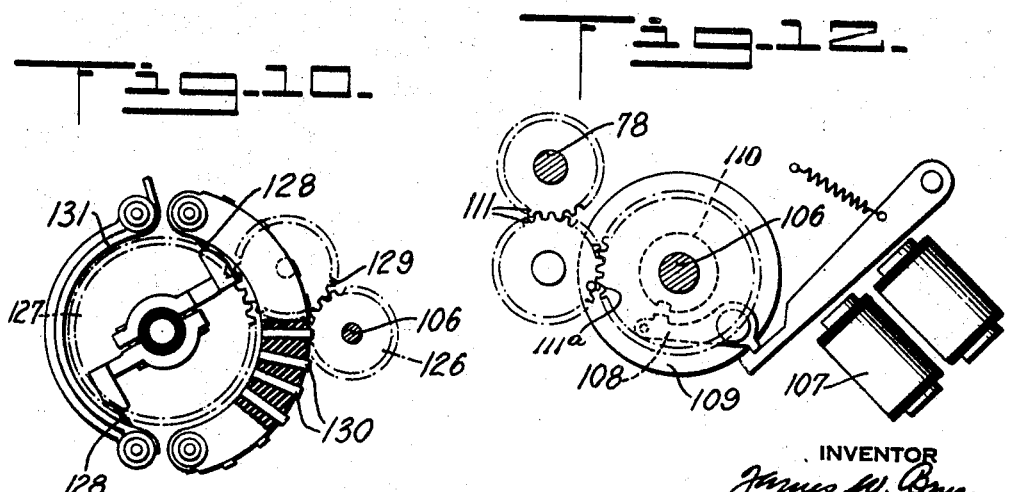

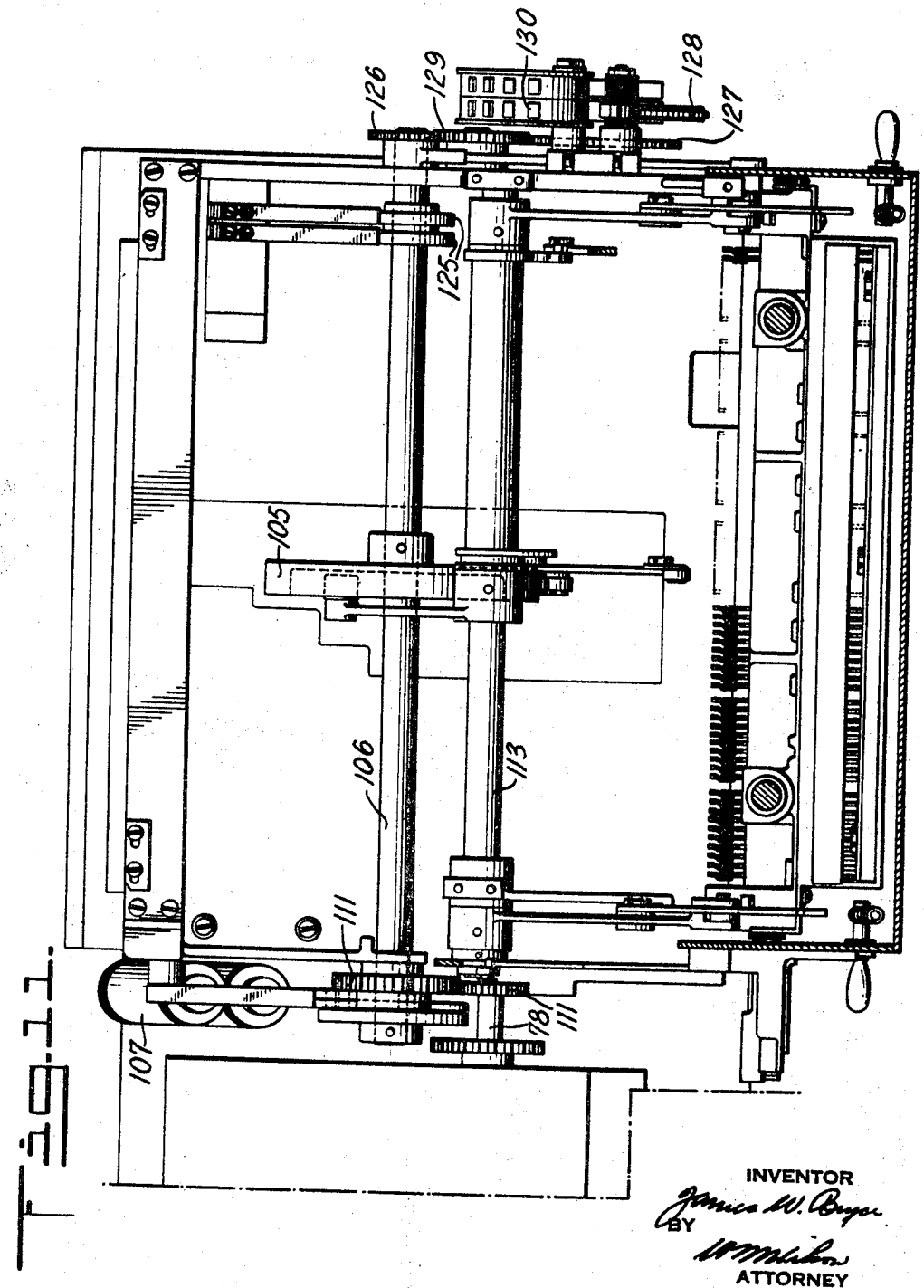
Dec. 30, 1941.  J. W. BRYCE  2,268,498
STATISTICAL MACHINE
Filed June 30, 1939  9 Sheets-Sheet 7

Dec. 30, 1941.   J. W. BRYCE   2,268,498
STATISTICAL MACHINE
Filed June 30, 1939   9 Sheets-Sheet 8

Dec. 30, 1941. J. W. BRYCE 2,268,498
STATISTICAL MACHINE
Filed June 30, 1939 9 Sheets-Sheet 9
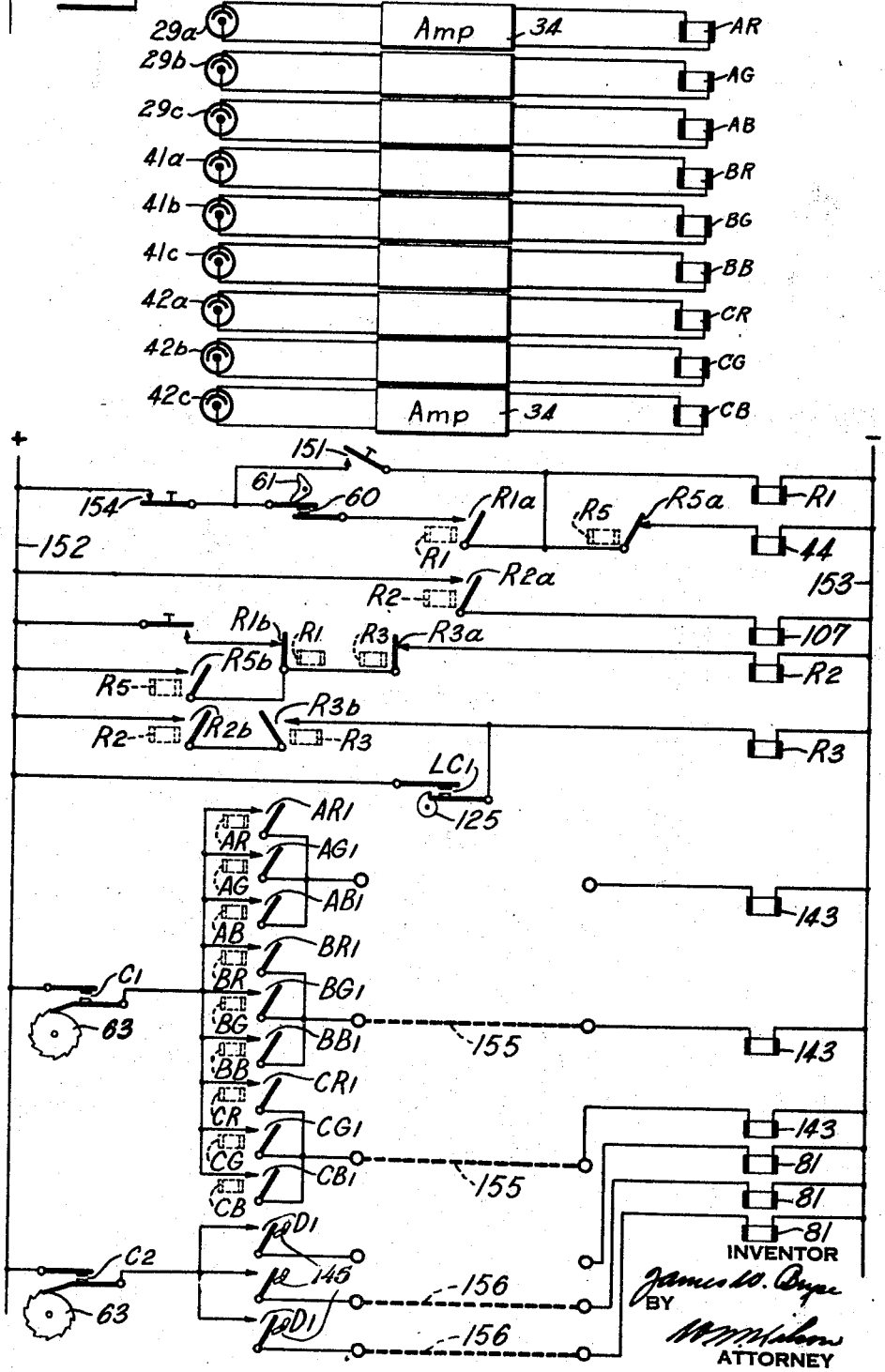

Patented Dec. 30, 1941

2,268,498

UNITED STATES PATENT OFFICE 2,268,498

STATISTICAL MACHINE

James W. Bryce, Glen Ridge, N. J., assignor to International Business Machines Corporation, New York, N. Y., a corporation of New York Application June 30, 1939, Serial No. 282,206

6 Claims. (Cl. 235—61.7)

This invention relates to improvements in statistical machines and more particularly to improvements in such machines which are controlled by light modifying control elements such as photographic control records.

One of the objects of the present invention resides in the provision of means whereby the colors of the data designations disposed on the photographic control records are effective to exercise control over the operations of the statistical machines.

Another object of the present invention resides in the provision of means whereby the normal operations of the record feeding means are interrupted upon the sensing of differently colored data designations.

Still another object of the present invention is the provision of means whereby upon sensing differently colored data designations different control means of the machines are called into action to effect different statistical operations.

Still another object is the provision of means whereby total taking operations are effected automatically upon sensing a change in the color of the data designations.

To illustrate one method for attaining the objects just set forth, provision is made whereby photographic control records are presented successively to a single analyzing or sensing station whereat the records are transilluminated so that the differently colored data designations are sensed and effective to control or condition suitably arranged light responsive means in accordance with the color of the sensed designations. The colored light rays set up by the control spots or data designations are directed to a plurality of photocells by means of light conducting rods, the said photocells are provided with different color filters so that one of them is effective to absorb or expel the color rays from the associated photocell and thus condition the said photocell to render a suitable amplifying means operative for control purposes. Now, in the chosen illustration, means are provided whereby the amount data is entered continuously into an accumulator as long as the color of the glass data designations is in a predetermined range, however, upon change of the selected color range of the class data designations, the normal operations of the record feeding means are interrupted, further entry of the amount data into the accumulator is discontinued and total taking operations are effected. It will be understood as the description of the instant application progresses that the statistical machine operations mentioned can be effected by means of the amount data solely which can be formed on the different records in different colors thereby representing by the said colors predetermined classes of data.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a fragmentary section of a portion of the machine control element.

Fig. 2 is a diagrammatic view of the record analyzer.

Fig. 3 is a sectional view of the film feeding and analyzing means.

Fig. 4 is a plan view of the film feeding and analyzing means shown in Fig. 3.

Fig. 5 is a detail view of the film feeding means.

Fig. 6 is a diagrammatic view of the cam controlled contacts.

Fig. 7 is a plan view of the contact assembly shown in Fig. 6.

Fig. 8 is a sectional view of the accumulating means.

Fig. 9 is a central section of the essential elements of the printing means.

Fig. 10 is a detail of an impulse emitting commutator.

Fig. 11 is a plan sectional view showing the main driving and operating mechanism of the printing means.

Fig. 12 is a detail of the clutch of the printing means.

Fig. 14 is a diagrammatic view of the data storing elements.

Figure 15B:
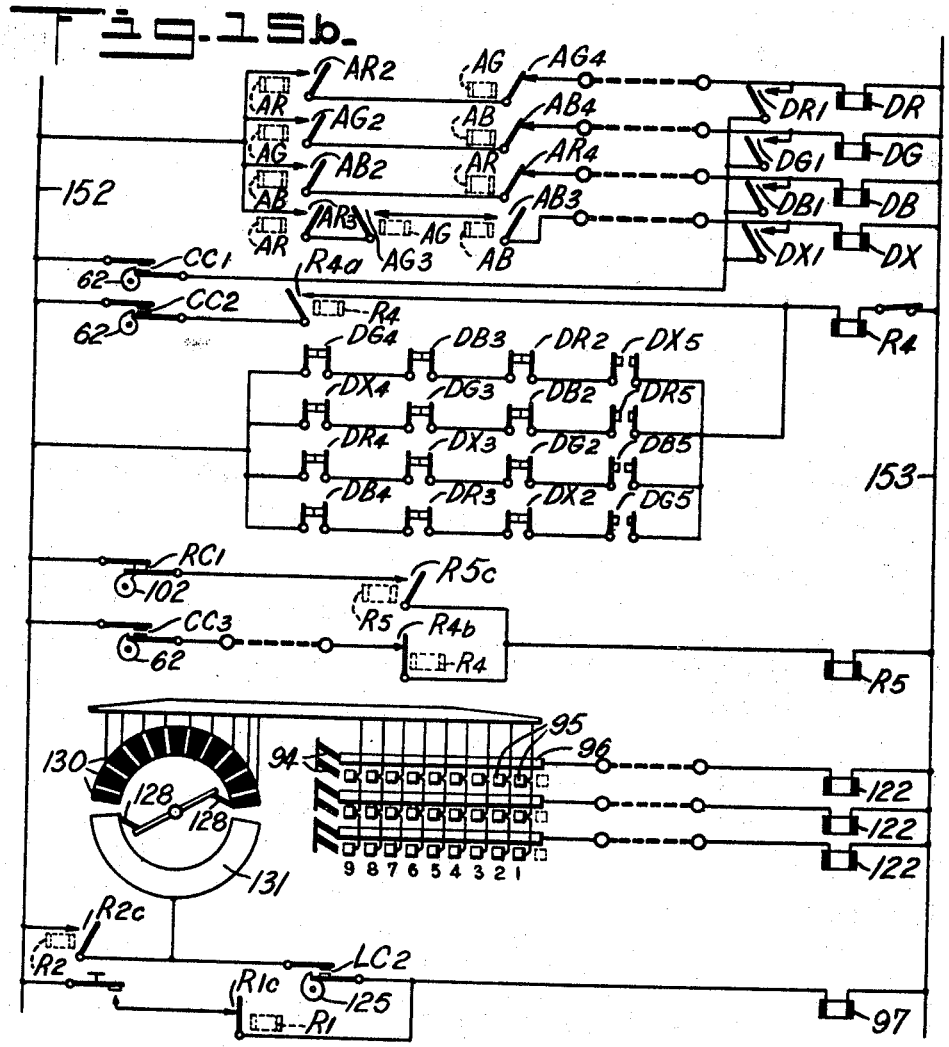

Figs. 15a and 15b taken together comprise a wiring diagram of the circuits of the machine.

Before describing the operation of the improved statistical machine which forms the subject matter of the instant application, the photographic control record and the method of analyzing the colored data designations disposed thereon will be described first, followed thereby by a description of the different control units utilized in the said machine.

*Photographic control records*

Referring now to Fig. 1, the photographic control element 20 shown therein is a fragmentary section of a continuous strip of photographic color film, provided with the usual feed apertures 24, upon which film are formed a plurality of individual records *a* to *e* comprising groups of data designations 21 and 22 in the form of discrete and differently colored control spots. One type of color film which is suitable for the purposes described in the instant application is the "Agfacolor" film which comprises a single unitary film structure consisting of a support upon which is coated in thin superimposed layers a plurality of light sensitive emulsions, each particularly sensitive to one of the primary colors. By exposing such a film to a colored object, three separate color records are recorded simultaneously, each sensitized layer recording the image to which it is color-sensitive. The color formation is brought about by the development of the film. Assume that the film 20 has been suitably exposed to record the data thereon in color and that the color formation of the data as designated is brought out by development of the recorded film.

The spot representations 21 represent suitable classification data and the spot representations 22 represent amount data. The data represented by the reference character 23 is shown merely for interpreting the associated coded control spots and are not used for controlling machine operations. Assume that the data shown in the individual records *a* and *b* are formed in red color, the data in record *c* in blue, the data in record *d* in green, and the data in record *e* in black.

The spot representations 21 and 22 are photographic machine control spot representations and each set of numerical data comprises one or more control spots in such relative position, in different columnar areas, upon the film record as to represent by their relative position thereon the numerical control value thereof. In practice and according to the embodiment shown, such numerical spot representations are shown on the film in index point relation in general conformance with the manner in which index perforations are disposed on perforated record cards in the Hollerith accounting system. That is, the differential position of a control spot representation delineates the numerical value of a particular numeral. This will be clear by referring to the figure and particularly record *a* wherein the data represented by the designations or control spots 22 represent the amount twenty-seven.

It will be understood that the completed film has photographic reproductions thereon at successively spaced intervals along the film and that the reproductions are in extremely compact form, accordingly, a large quantity of statistical information can be placed on an extremely small controlling record.

Method of analyzing color of data designations

Referring now to Fig. 2 the method of analyzing the colored control spots formed on the film will now be explained briefly. Assume that the film 20 is advanced in the direction shown by the arrow past the sensing station which is represented by an aperture 25 in the opaque member 26, and that the color of the control spot presented to the said sensing station is red. Light rays emanating from a suitable source 27 are directed by the condenser 28 to the aperture 25 to permeate the section of the film presented to the said aperture. The red rays transmitted by the control spot are directed to different photocells 29a, 29b and 29c by means of the light conducting means comprising a three-way quartz rod member 30. Suitable light ray filters 31 to 33 are disposed between the individual legs of the quartz rod member and the associated photocells. Assume that the filter 31 is a cyan color filter designed to pass the different colored rays excepting red rays which are absorbed by this filter, that the filter 32 is a magenta color filter permitting the colored rays with the exception of green to pass therethrough and that the filter 33 is a yellow color filter permitting the colored rays with the exception of blue to pass therethrough.

Now, since the red light rays are directed by the individual legs of the quartz member 30 to the individual filters 31 to 33, it is understood that the said rays are permitted to pass through the magenta and yellow filters to impinge upon the associated photocells 29b and 29c respectively, but are absorbed by the cyan filter so that no light rays are transmitted to the associated photocell 29a. Upon presentation of a blue control spot to the sensing station, it is seen that the cyan and magenta filters permit the rays to be transmitted to photocells 29a and 29b, respectively, whereas no blue light rays are transmitted by the yellow filter to the photocell 29c, and upon sensing a green control spot light rays are transmitted to photo cells 29a and 29c but not to photo cell 29b. In the event that a black control spot is presented to the sensing station no light rays are transmitted to any of the three photocells namely 29a to 29c.

Suitable amplifiers 34 are connected to the said photocells 29a to 29c (see Fig. 15a) in a manner well known in the art so that it is considered necessary only to state that when light rays of any color are impinging on the photocells the associated amplifiers are conditioned so that no current flows in their output circuits, whereas, when no light rays are transmitted to the photocells the associated amplifiers are conditioned so that current flows in the output circuits thereof as long as the light rays do not impinge thereon. The purpose of this arrangement will be understood as the description progresses.

Film feeding and sensing means

Referring now to Figs. 3, 4 and 5, the photographic color film 20 is shown disposed on a supply spool or reel 35. The film is attached to a take-up reel 36 and may be advanced by suitable driving connections cooperating with shafts 37 and 38 by means of suitable film feeding sprockets 39 and 40 secured to the said shafts, respectively, which sprockets cooperate with the film feed apertures 24 in the film. The film is fed past the analyzing station comprising the sensing aperture 25 and transilluminated by the light rays emanating from the light source 27 and directed thereto by the condenser 28. The said scanning aperture is arranged to present an opening sufficient to permit the scanning of a single transverse row of data or control spots only and is provided to extend transversely across the film record to any desired extent so as to permit the desired columns on the film to be sensed. The reference characters 29a, 41a and 42a designated in Fig. 4 represent the plurality of rows of photocells which are disposed at the analyzing station and controlled by the light rays impinging thereon. Each row of photocells, in the present illustration, comprises three photocells, for example, in Fig. 3, they are designated 29a to 29c. It is understood for each columnar area on the film, three individual photocells are provided and arranged as described. For each row or order of photocells a three-way light conducting member 30 is provided, said member comprises a quartz rod member having three conducting legs for transmitting the light rays from the sensing aperture 25 to the associated photocells. The said quartz members are suitably supported by the block 43 and as mentioned the legs thereof extend from each photocell to the analyzing station where the common legs are positioned adjacent to one another along the sensing aperture. The spacing of the common legs of the quartz members along the said aperture is so arranged that each leg is positioned opposite one of the columns of control spots disposed on the film. In this manner the light rays directed to the sensing aperture can be conducted to the associated photocells to condition the latter for machine control operations during the sensing operations.

As mentioned before individual color filters 31 to 33 are provided to be interposed between the individual legs of the quartz members 30 and the associated photocells. In Fig. 3, the color filters designated 31 to 33 are the cyan magenta and yellow color filters referred to hereinabove for the purposes set forth. It is understood that the three filters are provided for each order and interposed between the legs of the quartz members and associated photocells as shown in Fig. 3.

The film feeding means and control means therefor comprise generally the clutch magnet 44 and the associated pivoted armature 45 to which is secured a latch lever 46 normally engaging an extension 47 of the member 48 secured to shaft 38, and the clutch pawl 49 pivotally supported by member 48 and normally disengaged from the clutch element 50 by means of the said latch lever. Upon energization of magnet 44, the latch lever 46 is caused to release the pawl 49 to engage the clutch element 50 which is rotatably mounted on shaft 38 and rigidly secured to gear 51 which is driven by suitable means such as the gear 52 secured to drive pulley 53, and the associated driving connection 54. Thus it is seen that whenever the driving connections are operated and the magnet 44 energized that shaft 38 is rotated and in addition thereto gear 55, which is secured thereto, rotates gears 56 and 57 the latter being secured to shaft 37, thereby rotating said shaft and causing the respective feed sprockets 40 and 39 to feed the film to the analyzing station. The control spots disposed on the film are then effective to modify the light rays emanating from the light source as described hereinabove for controlling the conditioning of the associated photo cells.

Figure 13:
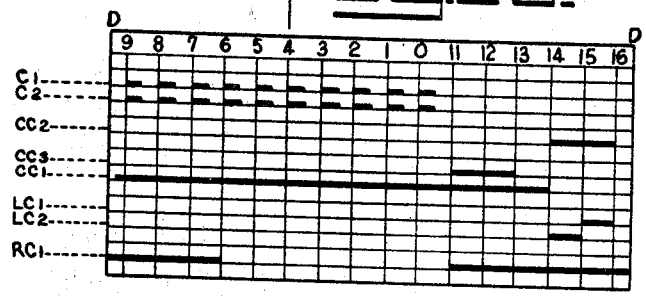
Fig. 13 is a timing chart of certain of the control elements of the machine.

It should be mentioned that film supply control contacts 60 (Fig. 5) are provided and adapted to be closed by the suitably pivoted lever 61 as long as the film is presented to the analyzing station, however, when the film supply is exhausted the said lever swings to the left as viewed in Fig. 5 to open the contacts 60 the purpose of which will be understood as the description progresses. On shaft 37 a plurality of cams 62 are provided, similar to the one shown and designated in Fig. 3, for controlling the associated contacts CC1 to CC3 (see Fig. 15b); also on the said shaft 37, a plurality of cams 63 similar to the one shown, are provided for controlling the contacts C1 and C2 (Fig. 15a) so that the said contacts are closed only at the times the index point positions are presented to the analyzing station as indicated in the timing chart in Fig. 13.

In addition thereto, a plurality of control devices are provided one of which will now be explained (see Figs. 6 and 7). The purpose of these devices will be understood when the operation of the machine is described. Upon the shaft 38 a ratchet member 65 and cam member 66 are securely mounted, and interposed between the said members and freely mounted on the said shaft is a cam member 67. Pivotally mounted on the cam member 67 is a pawl 68 which is normally held out of engagement with ratchet 65 by the latch lever 69 which can be an integral part of the armature 70 of the magnet DR. Upon energization of the said magnet the pawl 68 is released to engage the rotating ratchet 65 thereby effecting rotation of cam 67. Cam 67 is provided with a depression 67a in which the roller 67b on the end of arm 71 rests when the said cam is at rest. Rotation of cam 67 causes the follower arm 71 to be partially rotated in a counterclockwise direction to release the double armed lever 72. Normally, when the lever 72 is latched in the position shown in Fig. 6 the free arm thereof is displaced out of the path of the high point of the cam 66 which is rotated continuously by shaft 38. However, upon release of the lever 72 the tension of the spring blades of contacts DR2 to DR5 is sufficient to urge the free arm of the said lever into the path of the high point of cam 66, which in turn, upon engagement of the cam with the free arm of the lever tends to restore the lever to the normal position shown in the figure. If the magnet DR is deenergized and cam 67 is not rotated when the lever 72 is restored by cam 66 the lever 72 is latched by the follower arm 71, however, if cam 67 is again released in the cycle when the lever 72 is restored by cam 66 the said lever is not latched by arm 71. Upon energization of magnet DR the contacts DR1 are closed by the lever 69 and upon rotation of cam 67 and release of lever 72 contacts DR2 to DR4 are opened and contacts DR5 are closed. The timing arrangement is such that the magnet DR is energized at a differential time in the cycle between the nine and zero points of the cycle (see Fig. 13). In the following cycle the cam 67 will be latched by lever 69 if the said magnet is not energized during the said following cycle. At the fifteen point in the cycle cam 66 tends to restore lever 72 to its normal latched position, due to the engagement of the high point of cam 66 with the free end of lever 72, thereby tending to restore the associated contacts to the normal position. Lever 71 effects the latching of lever 72 if the cam 67 is held latched in its normal position. This latching can occur only when the cam 67 is held at rest permitting the roller 67b on the end of arm 71 to rest in depression 67a, for at all other times the end of lever 71, arranged to engage lever 72, is in a raised position thereby preventing the latching of lever 72. Further control operations regarding the latching of lever 72 will be described in connection with the operation of the machine. A number of control magnets similar to magnet DR are provided for controlling similar cams and contacts and are identified in the circuit diagram as the group of magnets DR, DG, DB and DX for controlling the associated contacts which will be referred to later on.

The gear 52 is arranged to cooperate with gears 75 and 76, the former rotatably mounted on shaft 77 and the latter fixedly mounted on shaft 78, so that the shaft 78 is rotated continuously by the described driving connections. The gear 55 also is in constant mesh with a gear 52a rotatably mounted on drive shaft 52b, the latter in turn engaging idler gear 76a which is rotatably mounted on shaft 78. The gear 76a is in constant mesh with gear 79 which is pinned to shaft 80. The shaft 78 is the accumulator drive shaft, shaft 77 is the accumulator reset shaft, and shaft 80 is a drive shaft for the data storing units.

*Data accumulating means*

Referring now to Fig. 8, the operation of the data accumulating means will be briefly described. This unit is well known in the art and requires no detailed description; for a detailed description reference may be made to U. S. Patent No. 1,976,617. Magnet 81 may be energized at differential times during the sensing cycle of the machine depending upon the timed interval a control spot is sensed on the firm record. Energization of the magnet attracts the armature 82 to permit displacement of the lever 83, by means of leaf spring 84, causing the latching member 85 slidably mounted on the shaft 86 to engage the member 87 integral with the gear 88 which is rotatably mounted on shaft 86. Gear 88, when thus coupled to shaft 86, is rotated thereby due to the gearing thereto from the shaft 78 generally indicated 89 and 90. Rotation of gear 88 causes the rotation of gear 91 to effect displacement of the accumulator index wheel 92. Also driven by gear 88 is a gear 93 which is displaced in the same manner as index wheel 92. The ratio of gears 91 and 93 is one to two so that the latter will turn through half a revolution for each revolution of the former gear. Carried by and insulated from gear 93 is a pair of electrically connected brushes 94, one of which cooperates successively with the conducting segments 95 while the other cooperates with an arcuate conducting strip 96. The relationship of the parts is such that when the index wheel 92 is in its zero position, one of the brushes 94 is in contact with the zero segment and the other is in contact with the conducting strip, thus forming an electrical connection between the two. The positioning of the said brushes provides a concurrent electrical readout mechanism for controlling total printing operations and the electrical circuit involved in these operations will be more fully explained in connection with the description of the circuit diagram.

The control spots are disposed on the film record in such a manner, and the film feeding and accumulator means are operated in such timed relationship that, for example, when a control spot is sensed at the "9" position, indicated on the film, an impulse is initiated at that time which can be directed to the control magnet 81 to cause the clutching member 85 to be tripped to position the index wheel 92 and brushes 94 nine steps before a declutching operation is effected by control elements of the machine. For further detailed description of the accumulator operations such as denominational order transfer, restoration of the clutch elements and magnet armatures to normal position and resetting of the accumulator mechanism reference should be made to the aforementioned patent.

The resetting mechanism is shown to be controlled by the reset magnet 97 which when energized attracts the armature 98 to release the pawl 99 and member 100, upon which the said pawl is pivotally mounted. The released pawl then engages the clutch member 101 which is pinned to the gear 75 to effect rotation of the member 100 and shaft 77 to which the member 100 is secured thereby causing the resetting of the index wheels 92 and brushes 94 to the normal zero position as described in the said patent. Cam 102 is provided to be secured to shaft 77 for operating the associated contacts RC1 which will be referred to later on.

*Data printing means*

Referring now to Figs. 9 to 12, the data printing means will be described briefly. The printing control cam 105 secured to shaft 106 is rotated in timed relationship with the accumulator control shaft 78 and the film feed mechanism making one revolution for each frame analyzed whenever the control magnet 107 is energized.

Upon energization of the said magnet the pivoted dog member 108 supported by member 109 is released, the said member 109 being fixedly mounted on shaft 106. The released dog engages the driving clutch member 110 which is secured to gear 111a which is in turn rotatably mounted on shaft 106. Gear 111a and clutch member 110 are continuously rotated by means of shaft 78 and gearing 111 so that upon engagement of the released dog member with said clutch member the shaft 106, member 109, and cam 105 are rotated as long as the magnet 107 remains energized.

Follower arm 112 is shown to cooperate with and be actuated by a cam groove in the printing cam to rock shaft 113 to which is secured arm 114 which is linked to the printing crosshead 115. The said crosshead is mounted for vertical reciprocation and is effective to impart an upward movement to the type bars 116 by means of the resilient connections such as springs 117. The type bars are provided with a plurality of ratchet teeth 118 which cooperate with stopping pawls 119 so that the bars may be interrupted at various positions to present any of their type elements 120 to the printing platen 121 for cooperation therewith.

By virtue of the said spring connections, the type bars may be interrupted without interfering with the upward movement of the printing crosshead which has an invariable extent of movement controlled by the printing cam. Energization of any one of the control magnets 122 is effective to rock the spring pressed pivoted latch 123 for releasing the associated pawl 119 so that it may swing into engagement with teeth 118 and interrupt the further upward movement of the corresponding type bar. The energization of the printing control magnets may be controlled directly by the sensing means whereby upon detection of a control spot an impulse is initiated at such time and directed to the printing control magnet to interrupt the movement of the associated type bar. Since it was mentioned that the shaft 106 is operated in timed relationship with the feed mechanism, it is to be understood that the travel of the type bar is in synchronism with the passage of the control spots past the analyzing station so that the type elements corresponding to the data control spots will be presented to the printing position.

Associated with each type bar 116 is a printing hammer 124 which is positioned to strike the type elements which are placed in the printing position to effect printing therefrom. The printing hammers are actuated immediately after the positioning of the printing cross-head to the upper extremity of its movement. The detailed operation of the printing mechanism just described is well known and as mentioned is completely described in the U. S. Patent No. 1,976,617, so that further disclosure of this mechanism is deemed unnecessary.

It should be mentioned at this time that control cams 125 are provided and secured to shaft 106 to operate the suitably disposed contacts LC1 and LC2 (see Figs. 15a and 15b); also, carried by the extremity of said shaft is gear 126 which rotates the gear 127 and a pair of electrically connected brushes 128 carried thereby through an idler gear 129. One of the said brushes engages the conducting segment 130 while the other engages the common arcuate conducting strip 131. The timing is such that a brush 128 successively engages each of the segments 130 as a corresponding type element approaches the printing position. These contact devices, generally known as "total printing emitters" control the total printing circuits in a manner to be more fully explained hereinafter.

*Data storing means*

Referring now to Fig. 14, the data storing means will be described briefly, for a detailed description of this mechanism reference should be made to U. S. Patent No. 1,486,149. Secured to shaft 80 (which is driven at a definte rate relative to the movement of the film and operated only during film feeding operations) is a cycle wheel 135 (an individual wheel is provided for each row or column of control spots) having two sets of notches, each corresponding to the positions of the control spots in any given row or column of the film record, and the wheel makes one complete revolution during the period required to advance two consecutive frames or film records past the analyzing station.

On the shaft 80 are loosely mounted three arms 136, 137 and 138 to each of which is pivoted a spring actuated dog 139, 140 and 141, one end of which fits into anyone of the notches in the wheel 135, and the other end projects radially outward along the arm. Assuming, for the moment, that dog 139 is in engagement with a notch in the wheel and has been brought by the movement of the latter into engagement with the lever 142 while in its latched position, it is seen that the dog is thrown out of engagement with said wheel and halted in the position indicated in Fig. 14.

The movement of the parts is so timed that at the time a control spot of given value is passing the analyzing station to effect energization of the magnets 143, a notch in wheel 135 of corresponding value will be under the dog 139. The energization of the said magnet will, therefore, permit the engagement of the dog with the notch in the wheel 135 which corresponds in value to the then passing control spot on the film record. If no control spot in a given column is on one film record, the K notch will be engaged by the dog under conditions to be referred to later. After engagement, the arm 136 is carried in the direction shown by the arrow and moving in unison with the wheel.

A cam wheel 144 is rotated by suitable gearing (not shown) and has a number of teeth or points which knock back the lever 142 and relatch it before the next notch has come into position and before contacts D1, which will be referred to later herein, are operated. These contacts are arranged to be operated at the same instant that the correspondingly numbered index point position on the film record is passing the analyzing station.

Following the locked dog in its travel with the wheel 135, it reaches at a given time the contacts D1 and the end of the arm 136 engaging a lever 145 operates the said contacts. The said arm being still locked by its dog continues its movement to the point, at which dog 141 is shown in the figure, where it encounters a latch lever 146 and is thrown out of engagement with the wheel. Here it rests until a cam 147 (rotated by suitable gearing not shown) unlatches lever 146 and allows the said dog to engage with an S notch in the wheel 135, from which it is again unlocked by the lever 142.

Considering now the other arms 137 and 138 and their dogs 140 and 141, each goes through the same operations as described, but successively, that is to say, while dog 139 is unlocked and stationary, the arm 137 is being carried down to the contacts D1, and the dog 141 is being carried to the latch 146 where it will rest until the S notch on the wheel comes under it, when it is tripped by the cam 147. Associated with the levers 142 and 146 are lock latches 148 which engage the arms after they have been freed from the wheel and prevent any backward movement of the same. If no control spot is in a given column the corresponding magnet 143 will not be energized and under these conditions the uppermost dog indicated in the figure by reference character 139 must be released to engage the K notch. This is effected by knock-off cam 149 (rotated by any suitable gearing) so that the high point engages the latch lever 150 and withdraws it from engagement with the lever 142, once near the end of each cycle.

*Operation of the machine*

Referring now to Figs. 15a and 15b the description of the operation of the machine will be given. Assume that it is desired to effect total taking operations whenever the color of the class data analyzed is changed and that a plurality of film records are presented to the analyzing station containing the data in red color. As long as the color of the class data is red the corresponding amount data is entered into the accumulating means and film feeding operations are effected continuously. Since, in the instant illustration, only a single analyzing station is used it is necessary to store the amount data for a machine cycle until the successively analyzed control spots have been compared and until the color of the class data is determined.

In determining the color of the class data on successive film records, it is evident, since all of the color spots on a film frame are alike, that the units order of the class data need only be compared. Assume then that the units order of the class data is effective to control the conditioning of the photocells 29a to 29c and the amount data is effective to control the conditioning of the photocells 41a to 41c and 42a to 42c. Also assume that for the moment the film frames or records presented to the analyzing station contain the class and amount data in red color.

Depression of the start key closes the contacts 151 to complete a circuit from conductor 152 to contacts 154 of the stop key, said contacts 151 and coil of relay R1 to conductor 153 energizing said relay. A holding circuit is then established for said relay from conductor 152 to contacts 154, contacts 60 (now closed), contacts R1a to coil of the relay. The said circuits connected to conductor 152 are also extended to film feed control magnet 44 by means of the normally closed contacts R5a to energize the said magnet and effect feeding of the film records past the analyzing station.

Upon sensing of the red control spots the light rays are prevented from impinging upon the photocells 29a, 41a and 42a at the differential times the said spots are presented to the sensing means, thereby conditioning the associated amplifiers so that current flows in output circuits thereof at such times and effecting energization of the relays AR, BR and CR.

The following circuits are established immediately: One circuit extends from conductor 152 to contacts C1, contacts BR1 and CR1, conductors 155 to the control magnets 143 of the storage means, and conductor 153 energizing said magnets. Energization of the magnets 143 causes the corresponding dogs 139 to be released so that they engage the notches in wheels 135 to correspond to the values of the data sensed. In the following machine cycle the said released dogs are effective to operate the contacts D1 at differential times corresponding to the data stored in the said wheels. Another circuit extends from conductor 152 to contacts AR2 and AG4 to the coil of magnet DR and conductor 153, energizing said magnet to effect release of the corresponding cam 67 to close contacts DR1 and DR5 and open contacts DR2 to DR4. A holding circuit for the magnet is completed immediately from conductor 152 to contacts CC1 and DR1 to the magnet maintaining the magnet energized until near the end of the machine cycle. Upon closure of contacts DR5 a circuit is completed from conductor 152 to contacts DX4, DG3, DB2, and DR5 to coil of relay R4 and conductor 153, energizing said relay. Near the end of each cycle, cam contacts CC2 are closed and now are effective to establish a holding circuit for relay R4 through said cam contacts and R4a.

Near the end of each cycle contacts CC1 are opened to break any holding circuit established to energize the DR, DG, DB, and DX relay coils. However, the associated contacts DR2 to DR5, etc. remain operated until the related cam 67 is at rest, which occurs during the cycle following the cycle during which one of the control magnets DR, DG, etc. are energized, and until the cam 66 is effective to operate the lever 72, in order that the latter is effectively latched by the arm 71. Cam 66, at the fifteenth point of each cycle, tends to restore the operated contacts DR2 to DR5, etc. to the normal latched positions, and momentarily causes the contacts DR2 to DR4, for example, to be closed and contacts DR5 to be opened. Since the cam contacts CC2 are closed at this particular time in each cycle the relay R4, once energized during the cycle, is maintained energized at the fifteenth point in the cycle by the circuit from conductor 152 to cam contacts CC2, contacts R4a and coil of relay R4 to conductor 153.

Cam contacts CC3 close each cycle at the eleventh point in the cycle but due to energization of relay R4 before this point in the cycle contacts R4b are opened to prevent a circuit from being established to relay R5. It should be stated that as long as relay R5 remains deenergized film feeding operations continue and total taking operations are suppressed.

It is understood up to this point that as long as the color of the control spots presented to the sensing means is red, relay R4 is energized each cycle to prevent the energization of relay R5 for interrupting film feeding operations; and that the amount data stored in the wheels 135 are effective to operate the associated contacts D1 to energize the control magnets 81 of the accumulating means at differential times by the circuit from conductor 152 to contacts C2 and D1, conductors 156 to the said magnets and conductor 153 thereby effecting entry of the amount data in the accumulator.

Now assume that a film record containing data control spots formed in green color is presented to the analyzing station. For this condition the green rays are blocked from the photocells 29b, 41b and 42b thereby causing energization of the relays AG, BG and CG. Due to closure of contacts BG1 and CG1 the storing unit control magnets 143 are energized as before to store the data sensed in the wheels 135. Due to closure of contacts AG2 a circuit is established from conductor 152 to said contacts AG2, contacts AB4 and coil of magnet DG to conductor 153, energizing said magnet to release its corresponding cam 67 and effecting operation of the associated contacts, namely, closing contacts DG1 and DG5 and opening contacts DG2, DG3 and DG4. A holding circuit for magnet DG is completed by means of the contacts CC1 and DG1.

It is remembered that at the time the green control spots are sensed to effect energization of the magnet DG to open contacts DG2, DG3, DG4 and close contacts DG5 the contacts DR2 to DR5 are still operated by their related cam 67. The latter group of contacts are not restored to the normal position indicated in Fig. 6 until the fifteenth point of the cycle during which the green control spots are sensed. The restoring of the DR2 to DR5 contacts is effected by the high point of cam 66 at the said time. Due to this condition, namely, the operation of the DG contacts before the DR contacts are restored to normal, it will be found that no circuit can be completed from conductor 152 to the coil of relay R4 to energize this relay until after the fifteenth point of the cycle in which the green control spots are sensed. It is seen that the circuit described hereinabove for energizing relay R4 comprising conductor 152, contacts DX4, DG3, DB2, and DR5 and conductor 153 is ineffective at this time due to the opening of contacts DG3. The circuit that is established after the DR contacts are restored is from conductor 152 to contacts DB4, DR3, DX2 and DG5 to coil of relay R4 and conductor 153, energizing said relay and completing a holding circuit therefor through contacts CC2 and R4a. However, before relay R4 is energized by the circuit just traced, cam contacts CC3 are closed to complete a circuit from conductor 152 to said contacts CC3, contacts R4b and coil of relay R5 to conductor 153, energizing said relay and completing a holding circuit therefor through contacts RC1 and R5c. This holding circuit is maintained until contacts RC1 are opened.

Opening of contacts R5a effects deenergization of magnet 44 and prevents further film feeding operations, so that the film feeding operations are interrupted at the end of the cycle in which the said green control spots are sensed.

It is to be noted that the data sensed on the first film record containing the green control spots is still stored in the wheels 135 and at this time, the said wheels have not been effective to operate the corresponding D1 contacts to effect entry of the data in the accumulator. The sensed data is stored during the total taking and reset cycles, due to the fact that the rotation of the said wheels 135 is interrupted at the time of and due to the interruption of the film feed. Closure of contacts R5b completes a circuit from conductor 152 to said contacts R5b, contacts R3a and coil of relay R2 to conductor 153, energizing said relay. Closure of contacts R2a completes a circuit from conductor 152 by means of said contacts to magnet 107, energizing said magnet and rendering the printing mechanism operative. Since contacts R2c are closed, circuits are established from conductor 152 to said contacts R2c, conducting segment 131 of the emitter device, brushes 128 and segments 130; to the corresponding segments 95 engaged by the brushes 94 of the accumulator readout devices and printing control magnets 122, thereby effecting a total printing operation. Near the end of the printing cycle cam contacts LC2 are closed to energize the magnet 97 to effect a resetting operation, that is, to restore the accumulator index wheels to zero position. The circuit can be traced from conductor 152 to contacts R2c to contacts LC2 and coil of magnet 97 to conductor 153.

Contacts LC1 are also closed near the end of the printing cycle to effect energization of relay R3; energization of said relay causes the relay R2 to be deenergized, by means of contacts R3a, thus causing the printing unit control magnet 107 to be deenergized, rendering the printing unit inoperative. The holding circuit for relay R5 is opened during the resetting operation by means of contacts RC1 thus permitting film feeding operations to be re-established at the end of the reset cycle. Upon closure of the contacts R5a a circuit can now be traced from conductor 152 to the contacts 154, 60, R1a (which remain closed until either contacts 154 or 60 are opened), contacts R5a and magnet 44 to conductor 153, energizing the film feed clutch magnet 44, and causing film feeding operations to be effected just as described hereinabove.

Now it will be understood that as long as the film records presented to the analyzing station contain green control spots, relay R4 is energized and film feeding operations are not interrupted until another color is sensed whereupon, at that time, the total taking and resetting operation will be effected as just described. The operations just set forth are the same for all the colors referred to namely red, green, blue and black. In the case of black spots the light rays are not permitted to impinge on any of the photocells of each group thus effecting energization of all the relays of each group namely AR, AG, AB, BR, BG, BB, CR, CG and CB. Due to the operation of said relays it is seen that relay DX and only this relay is operated to control the operations of relay R4 as just described.

The novel control record and means for analyzing said record described in the instant application are claimed in the copending applications, Serial No. 282,209, filed June 30, 1939, and Serial No. 282,210, filed June 30, 1939, respectively.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A record controlled machine of the class described comprising means for feeding control records having coded data designations in different columns thereon for representing the values of the data, the said designations of the records being formed in color, the colors of all the designations of an individual record being alike, and certain different records having their respective designations formed in different predetermined colors, means for sensing said colored data designations comprising a light source, light responsive means and elements for rendering the light responsive means selectively responsive to certain colors of the data designations, said light responsive means being conditioned by the light rays modified by the colored data designations, a plurality of control circuits, one for each color of the data designations formed on the records, means controlled by the light responsive means for selecting and energizing those circuits corresponding to the colors of the designations sensed on the different records, means controlled by said control circuits for detecting a change in the color of the sensed data designations, and means controlled by said detecting means for controlling the operation of said feeding means.

2. A record controlled machine of the class described comprising means for feeding control records having coded data designations in different columns thereon for representing the values of the data, the said designations of the records being formed in color, the colors of all the designations of an individual record being alike, and certain different records having their respective designations formed in different predetermined colors, means for sensing said colored data designations comprising a light source, light responsive means and elements for rendering the light responsive means selectively responsive to certain colors of the data designations, said light responsive means being conditioned by the light rays modified by the colored data designations, a plurality of control circuits, one for each color of the data designations formed on the records, means controlled by the light responsive means for selecting and energizing those circuits corresponding to the colors of the designations sensed on the different records, means controlled by said control circuits for detecting a change in the color of the sensed data designations, and means controlled by said detecting means including means for interrupting the normal feeding operation of the said feeding means when a change in color of the said designations is sensed.

3. A record controlled machine of the class described comprising means for feeding control records having coded data designations in different columns thereon for representing the values of the data, the said designations of the records being formed in color, the colors of all the designations of an individual record being alike, and certain different records having their respective designations formed in different predetermined colors, means for sensing said colored data designations comprising a light source, light responsive means and elements for rendering the light responsive means selectively responsive to certain colors of the data designations, said light responsive means being conditioned by the light rays modified by the colored data designations, a plurality of control circuits, one for each color of the data designations formed on the records, means controlled by the light responsive means for selecting and energizing those circuits corresponding to the colors of the designations sensed on the different records, means controlled by said control circuits for detecting a change in color of the sensed data designations, and a control element controlled by the last mentioned means upon detecting a change in color of the sensed data designations.

4. A record controlled machine of the class described comprising means for feeding individual records, each record being provided with a control designation, and certain different records having their respective control designations formed in different predetermined colors, means for sensing said colored control designations on the records comprising a light source, light responsive means and elements for rendering the light responsive means selectively responsive to certain colors of the control designations, said light responsive means being conditioned by the light rays modified by the colored designations, a plurality of control circuits, one for each color of the control designations formed on the records, means controlled by the light responsive means for selecting and energizing those circuits corresponding to the colors of the designations sensed on the different records, means controlled by said control circuits for detecting a change in the color of the sensed control designations, and means controlled by said detecting means for controlling the operation of said feeding means.

5. A machine of the class described controlled by individual records, each record being provided with a control designation, and certain different records having their respective control designations formed in different predetermined colors comprising means for sensing said colored control designations on the records comprising a light source, light responsive means and elements for rendering the light responsive means selectively responsive to certain colors of the control designations, said light responsive means being conditioned by the light rays modified by the colored designations, a plurality of control circuits, one for each color of the control designations formed on the records, means controlled by the light responsive means for selecting and energizing those circuits corresponding to the colors of the designations sensed on the different records, means controlled by said control circuits for detecting a change in color of the sensed control designations, and a control element controlled by the last mentioned means upon detecting a change in color of the sensed control designations.

6. A machine of the class described controlled by individual records, each record being provided with a control designation, and certain different records having their respective control designations formed in different predetermined colors comprising means for sensing said colored control designations on the records comprising a light source, light responsive means and elements for rendering the light responsive means selectively responsive to certain colors of the control designations, said light responsive means being conditioned by the light rays modified by the colored designations, a plurality of control means, one for each color of the control designations formed on the records, means controlled by the light responsive means for selecting and controlling the operation of those control means corresponding to the colors of the designations sensed on the different records, means controlled by said control means for detecting a change in color of the sensed control designations, and a control element controlled by the last mentioned controlled means upon detecting a change in color of the sensed control designations.

JAMES W. BRYCE.